March 25, 1969     G. C. HETRICK     3,434,750
HOOK SNELLER
Filed March 3, 1967     Sheet _1_ of 3
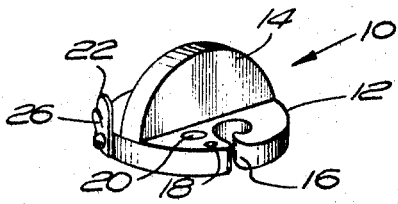
FIG. 1
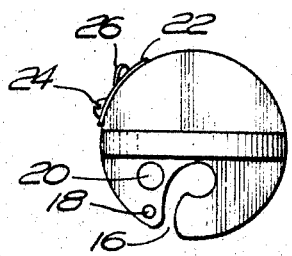
FIG. 2
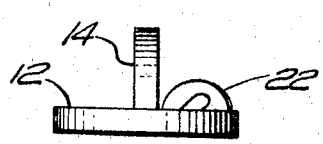
FIG. 3
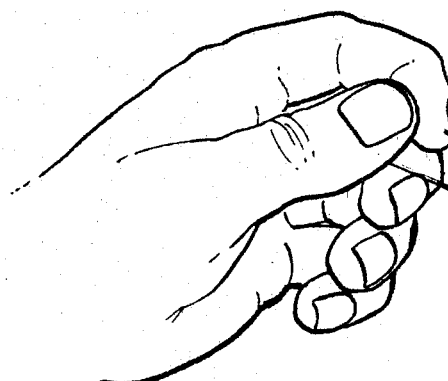
FIG. 4
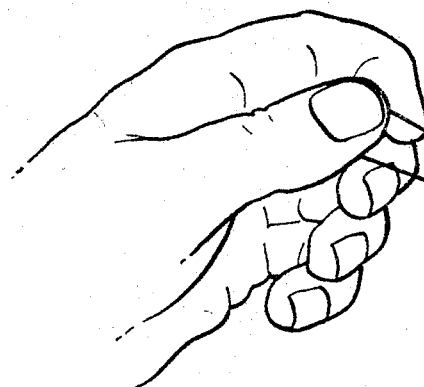
FIG. 5
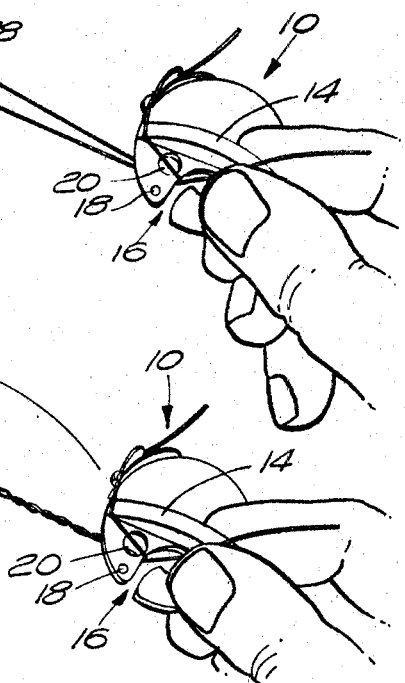
INVENTOR
GLENN C. HETRICK
BY
Morse, Altman + Oates
ATTORNEYS

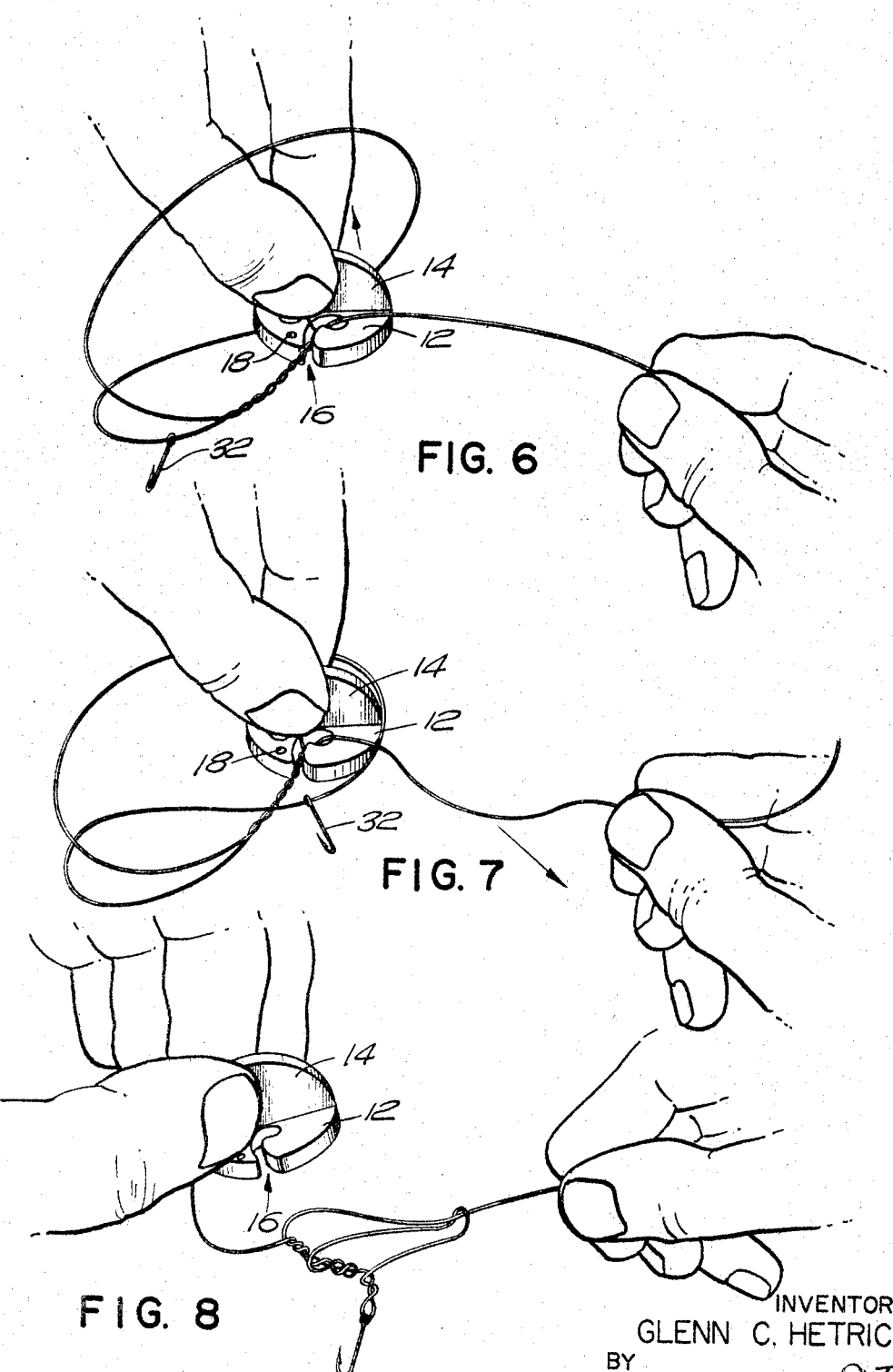

INVENTOR
GLENN C. HETRICK
BY Morse, Altman & Oates
ATTORNEYS

United States Patent Office 3,434,750
Patented Mar. 25, 1969

3,434,750
HOOK SNELLER
Glenn C. Hetrick, 2045 E. Parkway Drive,
Altoona, Pa. 16602
Filed Mar. 3, 1967, Ser. No. 620,331
Int. Cl. D03j 3/00
U.S. Cl. 289—17          8 Claims

ABSTRACT OF THE DISCLOSURE

A simple finger-held hook snelling device having no moving parts is provided. The device comprises a circular base portion with a center tab for gripping the device. The circular portion is formed with a reentrant opening in the edge thereof with a keeper provided on the device for temporarily restraining the free-end of the leader. The hook is threaded onto the leader, the free-end of the leader is snagged onto the keeper and looped through the reentrant opening. The loop is then twisted and passed over the device to form the snell. The hook is then caught in an opening formed in the body of the device and the leader pulled tight to form a snug, neat snell. A trimming device is provided to cut off free-hanging ends of the leader.

BACKGROUND OF THE INVENTION

Field of the invention

This invention relates generally to fishing accessories and more particularly is directed towards a new and improved device for snelling hooks onto leaders in quick, easy fashion.

Description of the prior art

Tying a hook or fly onto a leader requires considerable dexterity, particularly with a small hook and a springy leader such as those made of nylon or the like. It is particularly difficult and time consuming to make a small snug snell which will be tight against the eye of the hook. Furthermore, the task is particularly vexing when a number of different flies must be tried to find the one most attractive to the fish on a particular day.

Heretofore, there have been various types of devices available for use in snelling hooks to leaders, however, these devices generally have been rather complicated affairs and not particularly suitable for quick and easily forming snells of uniform high quality.

SUMMARY OF THE INVENTION

This invention features a hook snelling device comprising a small disc having a finger gripping tab of integrated construction and with no moving parts. The disc is formed with a reentrant slot opening in the edge thereof adapted to receive the leader and its looped free-end with the free-end passing over to another part of the device for engagement with a keeper. The device is operated by threading a hook to a leader and connecting the leader and its end in the above manner. The loop is then twisted a number of times and the loop is passed back over and around the device up the leader where the snell is formed. The hook is then engaged in a small opening in the disc and the leader pulled tight to form a neat snell. The keeper is provided with a trimming device for snipping off the free-end of the leader.

BRIEF DESCRIPTION OF THE DRAWINGS

FIG. 1 is a view in perspective of a hook sneller made according to the invention,
FIG. 2 is a top plan view thereof,
FIG. 3 is a view in front elevation thereof,
FIGS. 4 through 10 are views in perspective showing the sequential steps for snelling a hook and leader with the device and,
FIG. 11 is a side view of a finished snelled hook.

DESCRIPTION OF THE PREFERRED EMBODIMENT

Figure 9:
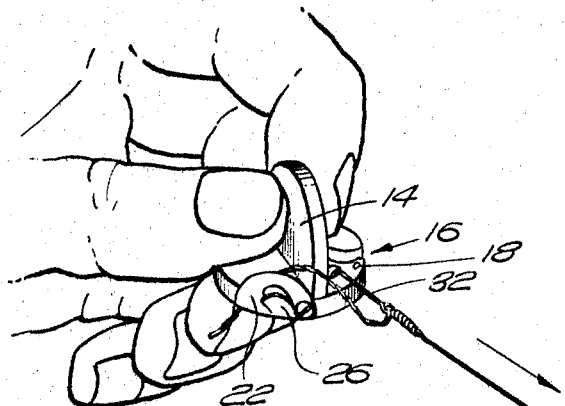
Figure 10:
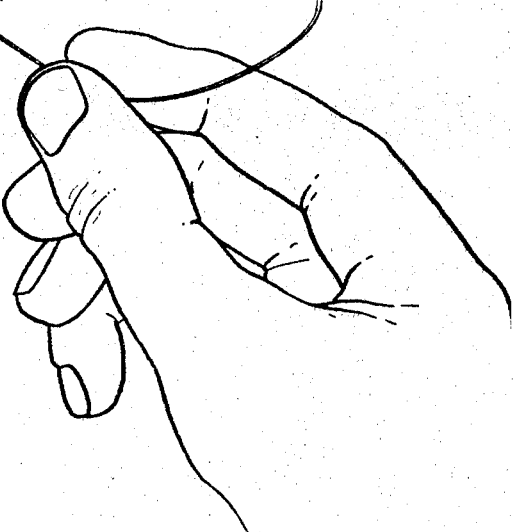

Referring now to the drawings and particularly to FIGS. 1 through 3 the reference character 10 generally indicates a hook snelling device made according to the invention and comprising a disc-shaped body portion 12 typically 1¼" in diameter and about ⅜₁₆" thick. A semi-circular tab 14 is fixed diametrically across the flat upper surface of the disc portion 12 extending at right angles therefrom. The tab serves as a gripping member by which the snelling device may be held, typically between the thumb and index finger.

On the left-hand side of the disc portion 12, as viewed in FIG. 2, there is formed an elongated, pear-shaped reentrant throat opening 16 originating at the outer edge of the disc portion and curving inwardly and downwardly where it enlarges towards the base of the opening. The opening then curves back, upwardly and outwardly to form a restricted entrance. Above the throat opening 16 are formed two circular openings 18 and 20 of different sizes for reasons that will presently appear.

Mounted to the edge of the disc 12 on the opposite side of the tab 14 is a small spring plate 22 fastened at one end by means of a tension screw 24. The curved plate ocnforms to the periphery of the disc 12 with the free portion extending clockwise from the screw 24. The plate serves as a keeper for the free-end of a leader to hold the leader during certain steps in the snelling operation. The plate is formed with a punched-out ear 26 having sharpened edges for trimming the leader upon completion of the snelling operation.

Referring now more particularly to FIGS. 4 through 10, there is illustrated the sequential steps to be followed in using the device 10 to snell a hook. The first step of the operation is to thread a leader 28 through an eye 30 of a hook 32. The free-end of the leader is then inserted in behind the keeper plate 22 where it is temporarily snagged. The free-end of the leader should extend from the base of the disc so that the leader can loop over the tap side of the device. As shown in FIG. 4, the free end of the leader is snagged onto the keeper plate 22 and a loop of about 6" is formed with both portions of the leader being laid into the throat 16, the free-end portion curving up over the tab down into the keeper plate.

The hook remains in the looped part of the leader and holding the looped end of the leader in the left hand, the device is held in the right hand with the leader being held by the thumb against the side of the tab 14. In this fashion the loop is twisted with respect to the device 10 approximately seven times by means of the left hand. During the twisting of the leader, the right thumb is kept on the leader against the tab and care is taken to insure that the hook stays within the loop area and does not slide down into the turns.

Once the leader has been twisted as described, the device 10 is passed through the loop, the left hand holding the device 10 by the tab 14 while the right hand holds the leader as shown in FIG. 6. When the device has been carried through the loop, the leader is pulled gently down and away from the device 10 forming a loose snell as shown in FIG. 7. When this has been done, the snelled hook is then eased out of the throat 16, the free-end of the leader still being held by the keeper plate. The next step, shown in FIG. 9, involves placing the hook 32 into one of the circular openings 18 or 20 formed in the disc. The openings 18 and 20 are of different sizes to accommodate different size hooks. With the hook thus engaging the device 10, the leader is pulled tightly by the right hand while the device is held tightly in the left hand. This will form a very neat snell. For the final step, the hook is detached from the device and the short free-end of the leader is placed in the ear 26 which is used to trim off the leader close to the snell.

Figure 11:
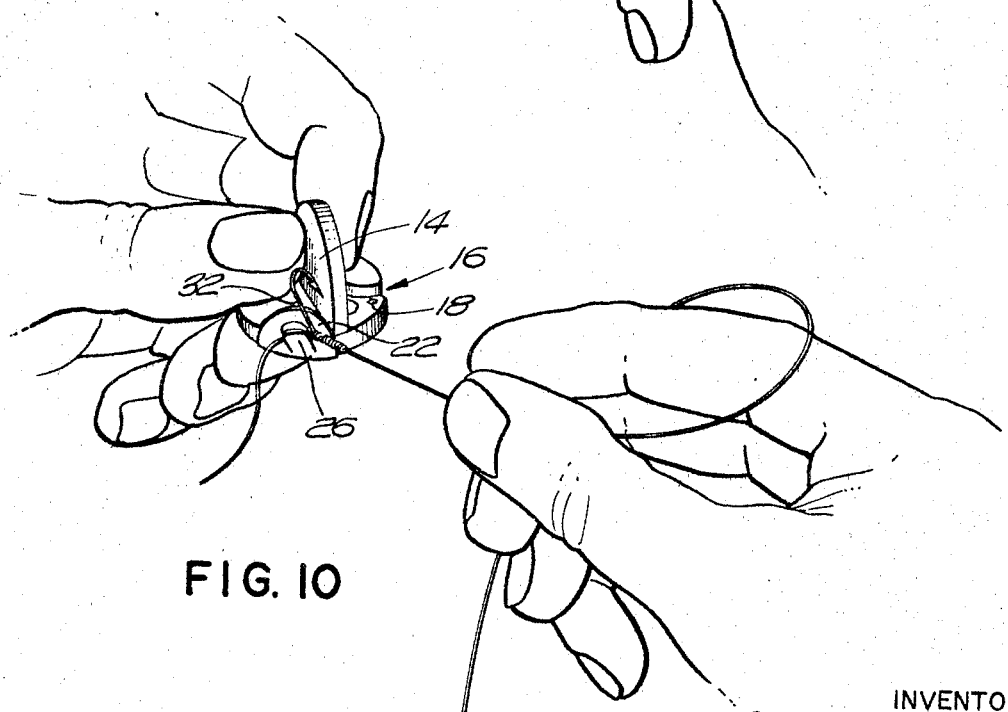

As shown in FIG. 11, the finished snell is extremely tight and neat, being formed of several convolutions with the free-end passing down through the turns parallel with the length of the leader, all of the turns being tightly bound and snug against the eye of the hook.

With very little practice, snells of uniform high quality may be made quickly and easily and by one without any particular manual dexterity. By using the device when fly casting, for example, flies may be changed on the spot with very little delay or trouble. The device is particularly useful when snelling with a rather stiff springy leader such as one made of nylon or the like.

The device is extremely simple, has no moving parts, can be fabricated at very low cost and can be easily carried in the pocket ready for use.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. A device for snelling a hook threaded onto a leader having a free end, comprising
   (a) a body,
   (b) said body being formed with finger gripping surfaces,
   (c) said body being formed with a re-entrant opening in one side thereof adjacent to said finger gripping surfaces to receive the doubled ends of said leader looped therethrough with a portion thereof lying across said surfaces for manual gripping, and
   (d) a keeper mounted to said body spaced from said opening and said surfaces for temporarily restraining the free end of said leader to permit twisting said body with one hand and restraining the looped leader with the other hand, then passing said loop over said body, releasing said leader portion from said opening and pulling on said leader while restraining said hook.

2. A device according to claim 1 wherein said keeper is a spring plate mounted against said body and adapted to snag the free end of said leader between said plate and body.

3. A device according to claim 2 wherein at least a portion of said plate is formed with sharpened edges for trimming said leader.

4. A device according to claim 1 wherein said body is formed with at least one hook engaging portion.

5. A device for snelling a hook to a leader having a free end, comprising
   (a) a flat circular body,
   (b) a semi-circular tab mounted diametrically across one flat face of said body perpendicularly therefrom,
   (c) said body being formed with a re-entrant opening in the edge thereof on one side of said tab to receive said leader, and
   (d) a keeper disposed on the edge of said body on the other side of said tab for temporarily restraining the free end of said leader.

6. A device according to claim 5 wherein said body is formed with at least one opening located inwardly from the edge thereof.

7. A device according to claim 5 wherein said keeper comprises a spring plate conforming to the curvature of the edge of said body and mounted thereto.

8. A device according to claim 7 wherein said plate is formed with an ear portion having sharpened edges for trimming said leader.

References Cited
UNITED STATES PATENTS

| | | | |
|---|---|---|---|
| 2,601,605 | 6/1952 | Fulvio | 289—17 |
| 2,843,961 | 7/1958 | Semple | 43—1 |
| 3,252,724 | 5/1966 | Kearns | 289—17 |
| 3,321,225 | 5/1967 | Miller | 289—17 |

LOUIS K. RIMRODT, *Primary Examiner.*